(12) United States Patent
Levings et al.

(10) Patent No.: US 9,388,798 B2
(45) Date of Patent: Jul. 12, 2016

(54) MODULAR HEAT-EXCHANGE APPARATUS

(75) Inventors: Natalie B. Levings, North Richland Hills, TX (US); Eugene C. Jansen, Dumfries, VA (US); Jared D. Gilbert, Falls Church, VA (US); Nicholas J. Nagurny, Manassas, VA (US); Robert J. Howard, Walkersville, MD (US); Stephen L. Bailey, Los Gatos, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 506 days.

(21) Appl. No.: 13/301,252

(22) Filed: Nov. 21, 2011

(65) Prior Publication Data

US 2012/0125561 A1    May 24, 2012

Related U.S. Application Data

(63) Continuation-in-part of application No. 13/032,119, filed on Feb. 22, 2011.

(60) Provisional application No. 61/388,881, filed on Oct. 1, 2010.

(51) Int. Cl.
*F24H 3/00* (2006.01)
*F03G 7/05* (2006.01)

(52) U.S. Cl.
CPC .. *F03G 7/05* (2013.01); *Y02E 10/34* (2013.01)

(58) Field of Classification Search
CPC .......................................................... F03G 7/05
USPC ................................................ 165/76, 47, 45
See application file for complete search history.

(56) References Cited

U.S. PATENT DOCUMENTS

| 2,040,947 | A | * | 5/1936 | Mojonnier et al. ............. 165/77 |
| 2,083,028 | A | | 6/1937 | Livar |
| 2,347,957 | A | * | 5/1944 | McCullough ................. 165/150 |
| 2,424,265 | A | | 7/1947 | Allen |

(Continued)

FOREIGN PATENT DOCUMENTS

| CN | 1333868 A | 1/2002 |
| CN | 2821508 Y | 9/2006 |

(Continued)

OTHER PUBLICATIONS

Examiner's Answer for U.S. Appl. No. 12/628,594, mailed Oct. 24, 2013, 12 pages.

(Continued)

*Primary Examiner* — Marc Norman
*Assistant Examiner* — Devon Russell
(74) *Attorney, Agent, or Firm* — Withrow & Terranova, PLLC

(57) ABSTRACT

A heat exchanger module for thermally coupling a first fluid and second fluid is disclosed. The heat exchanger module comprises a plurality of heat exchangers, each of which is fluidically coupled to a common seawater inlet and a common seawater outlet. The heat exchanger module is dimensioned and arranged for integrating with an OTEC system located on an offshore platform that is deployed in a body of water. The heat exchanger module physically and fluidically couples with ports included in pontoons attached to the offshore platform. The ports are individually controllable so that the module can be added or removed from the OTEC system without interrupting operation of other heat exchanger modules integrated with the OTEC system.

15 Claims, 6 Drawing Sheets

(56) References Cited

U.S. PATENT DOCUMENTS

| | | | |
|---|---|---|---|
| 2,540,339 A | 2/1951 | Kritzer | |
| 2,653,211 A | 9/1953 | Andrus | |
| 2,938,712 A * | 5/1960 | Pellmyr | 165/137 |
| 3,294,162 A | 12/1966 | Loehlein et al. | |
| 3,460,611 A | 8/1969 | Folsom et al. | |
| 3,476,179 A | 11/1969 | Meister et al. | |
| 3,595,310 A | 7/1971 | Burne et al. | |
| 3,805,515 A * | 4/1974 | Zener | 60/641.7 |
| 3,807,494 A | 4/1974 | Ris | |
| 3,825,061 A | 7/1974 | Bathla | |
| 4,055,145 A * | 10/1977 | Mager et al. | 119/212 |
| 4,095,646 A | 6/1978 | Granetzke | |
| 4,099,928 A | 7/1978 | Norback | |
| 4,149,591 A | 4/1979 | Albertsen | |
| 4,150,719 A * | 4/1979 | Thielen et al. | 165/140 |
| 4,253,516 A | 3/1981 | Giardina | |
| 4,276,927 A | 7/1981 | Foust | |
| 4,294,564 A * | 10/1981 | Person et al. | 405/224.2 |
| 4,323,114 A | 4/1982 | Corey | |
| 4,350,014 A * | 9/1982 | Sanchez et al. | 60/641.7 |
| 4,355,684 A | 10/1982 | Caines | |
| 4,401,155 A | 8/1983 | Royal et al. | |
| 4,432,307 A * | 2/1984 | Godin | 122/17.2 |
| 4,478,277 A | 10/1984 | Friedman et al. | |
| 4,592,416 A | 6/1986 | Mattison et al. | |
| 4,625,794 A | 12/1986 | Dürst | |
| 4,633,819 A | 1/1987 | Tilliette | |
| 4,688,631 A | 8/1987 | Peze et al. | |
| 4,693,304 A | 9/1987 | Volland | |
| 4,729,427 A * | 3/1988 | Baumann | 165/165 |
| 4,738,309 A | 4/1988 | Schilling | |
| 4,753,773 A | 6/1988 | Garabedian et al. | |
| 4,782,571 A | 11/1988 | Krips et al. | |
| 4,941,530 A | 7/1990 | Crowe | |
| 5,042,572 A * | 8/1991 | Dierbeck | 165/76 |
| 5,137,080 A | 8/1992 | Haasch et al. | |
| 5,285,843 A * | 2/1994 | Dierbeck | 165/69 |
| 5,289,870 A * | 3/1994 | Dierbeck | 165/76 |
| 5,303,770 A * | 4/1994 | Dierbeck | 165/140 |
| 5,448,830 A | 9/1995 | Borchert et al. | |
| 5,452,758 A * | 9/1995 | Mauterer | 165/145 |
| 5,499,674 A * | 3/1996 | Bartz et al. | 165/76 |
| 5,513,700 A | 5/1996 | Kleve et al. | |
| 5,590,707 A * | 1/1997 | Mauterer | 165/145 |
| 5,655,600 A | 8/1997 | Dewar et al. | |
| 5,775,412 A * | 7/1998 | Montestruc et al. | 165/134.1 |
| 5,813,592 A | 9/1998 | Midling et al. | |
| 5,988,266 A | 11/1999 | Smith et al. | |
| 6,009,938 A | 1/2000 | Smith et al. | |
| 6,035,928 A | 3/2000 | Ruppel et al. | |
| 6,059,026 A | 5/2000 | Bailly et al. | |
| 6,173,493 B1 | 1/2001 | Dierbeck | |
| 6,390,185 B1 | 5/2002 | Proeschel | |
| 6,637,109 B2 | 10/2003 | Nyqvist | |
| 6,808,689 B1 | 10/2004 | Matsumoto et al. | |
| 6,901,660 B2 | 6/2005 | Miska | |
| 6,945,322 B2 * | 9/2005 | Ikeda | 165/144 |
| 7,055,576 B2 | 6/2006 | Fernstrum | |
| 7,165,605 B2 | 1/2007 | Park et al. | |
| 7,328,578 B1 * | 2/2008 | Saucedo | 60/641.1 |
| 7,549,466 B2 | 6/2009 | Hayashi et al. | |
| 7,726,388 B2 * | 6/2010 | Toda | 165/145 |
| 7,921,558 B2 | 4/2011 | Beamer et al. | |
| 7,926,558 B2 | 4/2011 | Hagberg | |
| 7,967,060 B2 | 6/2011 | Trumbower et al. | |
| 8,540,012 B2 * | 9/2013 | Nagurny et al. | 165/165 |
| 2002/0153130 A1 | 10/2002 | Okamoto et al. | |
| 2005/0061485 A1 | 3/2005 | Hirafuji et al. | |
| 2005/0103482 A1 | 5/2005 | Park et al. | |
| 2005/0133567 A1 | 6/2005 | Runyan | |
| 2005/0173103 A1 | 8/2005 | Dawson | |
| 2006/0175051 A1 | 8/2006 | Kinoshita | |
| 2007/0029070 A1 | 2/2007 | Yamamoto et al. | |
| 2007/0131399 A1 | 6/2007 | Digele | |
| 2007/0138237 A1 | 6/2007 | Nishikawa et al. | |
| 2007/0284095 A1 | 12/2007 | Wang et al. | |
| 2008/0029254 A1 | 2/2008 | Sekito et al. | |
| 2008/0078536 A1 | 4/2008 | Tolani | |
| 2008/0135219 A1 | 6/2008 | Doh et al. | |
| 2008/0241615 A1 | 10/2008 | Sugimasa et al. | |
| 2009/0008066 A1 | 1/2009 | Meng et al. | |
| 2009/0065178 A1 | 3/2009 | Kasezawa et al. | |
| 2009/0159643 A1 | 6/2009 | Wimmer et al. | |
| 2009/0229804 A1 | 9/2009 | Zebuhr | |
| 2009/0294110 A1 * | 12/2009 | Foust | 165/152 |
| 2009/0308582 A1 * | 12/2009 | Nagurny et al. | 165/167 |
| 2011/0011570 A1 | 1/2011 | Levings et al. | |
| 2011/0011572 A1 | 1/2011 | Nagurny et al. | |
| 2011/0079375 A1 * | 4/2011 | Nagurny et al. | 165/166 |
| 2011/0120126 A1 * | 5/2011 | Srinivasan | 60/641.7 |
| 2011/0127022 A1 | 6/2011 | Eller et al. | |
| 2011/0173978 A1 * | 7/2011 | Rekret et al. | 60/641.7 |
| 2012/0011849 A1 * | 1/2012 | Cole et al. | 60/641.7 |
| 2012/0073291 A1 * | 3/2012 | Shapiro et al. | 60/641.7 |
| 2012/0080175 A1 | 4/2012 | Levings et al. | |
| 2013/0042612 A1 * | 2/2013 | Shapiro et al. | 60/641.7 |
| 2013/0042613 A1 * | 2/2013 | Ross et al. | 60/641.7 |
| 2013/0042996 A1 * | 2/2013 | Hwang et al. | 165/45 |

FOREIGN PATENT DOCUMENTS

| | | |
|---|---|---|
| CN | 203443419 U | 2/2014 |
| DE | 2351529 A1 | 4/1975 |
| DE | 19624937 A1 | 1/1998 |
| DE | 102005058314 A1 | 6/2007 |
| DE | 102007021420 A1 | 11/2008 |
| EP | 0174554 A1 | 3/1986 |
| EP | 1033546 A2 | 9/2000 |
| EP | 2072938 A2 | 6/2009 |
| FR | 1374955 A | 10/1964 |
| FR | 1559076 A | 3/1969 |
| FR | 2510729 A1 | 2/1983 |
| GB | 969319 A | 9/1964 |
| GB | 2424265 A | 9/2006 |
| JP | S5420690 B2 | 7/1979 |
| JP | 57018473 A | 1/1982 |
| JP | S6131889 A | 2/1986 |
| JP | S61213493 A | 9/1986 |
| JP | S6288169 U | 6/1987 |
| JP | 62158996 A | 7/1987 |
| JP | S62158996 A | 7/1987 |
| JP | S62136770 U | 8/1987 |
| JP | S62233684 A | 10/1987 |
| JP | S6317961 U | 2/1988 |
| JP | S63169494 A | 7/1988 |
| JP | S6344708 Y2 | 11/1988 |
| JP | 02077469 A | 3/1990 |
| JP | 02084252 A | 3/1990 |
| JP | H04214191 A | 8/1992 |
| JP | H05308829 A | 11/1993 |
| JP | H05340342 A | 12/1993 |
| JP | H622017 U | 3/1994 |
| JP | H0645159 Y2 | 11/1994 |
| JP | 10005681 A | 1/1998 |
| JP | H10339588 A | 12/1998 |
| JP | H1147960 A | 2/1999 |
| JP | H11503816 A | 3/1999 |
| JP | 2000073164 A | 3/2000 |
| JP | 2001133195 A | 5/2001 |
| JP | 2002066720 A | 3/2002 |
| JP | 2003037386 A | 2/2003 |
| JP | 2004167334 A | 6/2004 |
| JP | 3102194 U | 7/2004 |
| JP | 2005194624 A | 7/2005 |
| JP | 2006026721 A | 2/2006 |
| JP | 2006205252 A | 8/2006 |
| JP | 2006207950 A | 8/2006 |
| JP | 2006289481 A | 10/2006 |
| JP | 2006297437 A | 11/2006 |
| JP | 2006337000 A | 12/2006 |
| JP | 2007511735 A | 5/2007 |
| JP | 2007163073 A | 6/2007 |
| JP | 2007203347 A | 8/2007 |
| JP | 2008503047 A | 1/2008 |

(56) References Cited

FOREIGN PATENT DOCUMENTS

| JP | 2008070026 | A | 3/2008 |
|---|---|---|---|
| JP | 2008239451 | A | 10/2008 |
| JP | 2009517625 | A | 4/2009 |
| JP | 3178668 | U | 9/2012 |
| KR | 1020080076222 | A | 8/2008 |
| WO | 9632618 | A1 | 10/1996 |
| WO | 9749962 | A1 | 12/1997 |
| WO | 0181849 | A1 | 11/2001 |
| WO | 2006115073 | A1 | 11/2006 |
| WO | 2009056446 | A1 | 5/2009 |

OTHER PUBLICATIONS

Restriction Requirement for U.S. Appl. No. 12/690,373, mailed Apr. 18, 2013, 8 pages.
Non-Final Office Action for U.S. Appl. No. 12/690,373, mailed Aug. 7, 2013, 11 pages.
Final Office Action for U.S. Appl. No. 12/690,373, mailed Jan. 30, 2014, 12 pages.
Non-Final Office Action for U.S. Appl. No. 12/690,373, mailed Sep. 12, 2014, 12 pages.
Restriction Requirement for U.S. Appl. No. 12/836,688, mailed Jul. 31, 2013, 9 pages.
Restriction Requirement and Interview Summary for U.S. Appl. No. 12/836,688, mailed Aug. 23, 2013, 11 pages.
Non-Final Office Action for U.S. Appl. No. 12/836,688, mailed Nov. 6, 2013, 15 pages.
Non-Final Office Action for U.S. Appl. No. 12/836,688, mailed Dec. 5, 2014, 14 pages.
Non-Final Office Action for U.S. Appl. No. 12/838,114, mailed Apr. 10, 2013, 13 pages.
Final Office Action for U.S. Appl. No. 12/838,114, mailed Aug. 8, 2013, 15 pages.
Final Office Action for U.S. Appl. No. 12/690,373, mailed Apr. 30, 2015, 11 pages.
Advisory Action for U.S. Appl. No. 13/032,119, mailed Jun. 30, 2015, 3 pages.
Final Office Action for U.S. Appl. No. 12/836,688, mailed Jun. 5, 2015, 14 pages.
Notice of Allowance for U.S. Appl. No. 12/484,542, mailed Mar. 22, 2013, 8 pages.
First Office Action for Korean Patent Application No. 10-2015-7007662, mailed May 12, 2015, 8 pages.
Examination Report for European Patent Application No. 10 740 788.4, mailed May 20, 2015, 4 pages.
Final Office Action for U.S. Appl. No. 12/573,982, mailed Aug. 24, 2015, 11 pages.
Advisory Action, Applicant-Initiated Interview Summary, and AFCP 2.0 Decision for U.S. Appl. No. 12/836,688, mailed Sep. 11, 2015, 6 pages.
Non-Final Office Action for U.S. Appl. No. 13/032,119, mailed Oct. 23, 2015, 15 pages.
Third Office Action for Chinese Patent Application No. 201080032268.3, issued Nov. 23, 2015, 4 pages.
U.S. Appl. No. 12/690,373, filed Jan. 20, 2010.
U.S. Appl. No. 12/573,982, filed Oct. 6, 2009.
U.S. Appl. No. 12/628,594, filed Dec. 1, 2009.
U.S. Appl. No. 12/836,688, filed Jul. 15, 2010.
U.S. Appl. No. 12/838,114, filed Jul. 16, 2010.
U.S. Appl. No. 13/032,119, filed Feb. 22, 2011.
Non-Final Office Action for U.S. Appl. No. 13/032,119, mailed Aug. 16, 2013, 15 pages.
Non-Final Office Action for U.S. Appl. No. 13/032,119, mailed Nov. 21, 2013, 19 pages.
Final Office Action for U.S. Appl. No. 13/032,119, mailed Jan. 3, 2014, 14 pages.
Non-Final Office Action for U.S. Appl. No. 13/032,119, mailed Dec. 4, 2014, 17 pages.
Final Office Action for U.S. Appl. No. 13/032,119, mailed Mar. 26, 2015, 16 pages.
Stone, K.M., "Review of Literature on Heat Transfer Enhancement in Compact Heat Exchangers," ACRC TR-105, Air Conditioning and Refrigeration Center, University of Illinois, Aug. 1996, 39 pages.
Yang, T. L. et al., "Forced Heat Convection of Wavy Fin Channel," Journal of Thermal Science and Technology, vol. 3, No. 2, 2008, pp. 342-354.
Patent Examination Report No. 1 for Australian Patent Application No. 2010273345, issued Nov. 1, 2012, 3 pages.
Patent Examination Report No. 1 for Australian Patent Application No. 2010273997, issued Nov. 16, 2012, 3 pages.
Patent Examination Report No. 2 for Australian Patent Application No. 2010273997, issued Jul. 17, 2013, 3 pages.
Patent Examination Report No. 3 for Australian Patent Application No. 2010273997, issued Oct. 4, 2013, 3 pages.
Patent Examination Report No. 1 for Australian Patent Application No. 2010-303747, issued Mar. 12, 2013, 3 pages.
Examiner's Report for Canadian Patent Application No. 2,766,917, issued Mar. 26, 2012, 2 pages.
Office Action for Canadian Patent Application No. 2,766,917, issued Mar. 21, 2013, 4 pages.
Office Action for Canadian Patent Application No. 2,766,917, issued Apr. 23, 2014, 2 pages.
Office Action for Canadian Patent Application No. 2,767,174, issued Jun. 3, 2013, 3 pages.
Office Action for Canadian Patent Application No. 2,767,174, issued Mar. 6, 2014, 2 pages.
Office Action for Canadian Patent Application No. 2,774,682, mailed Sep. 9, 2013, 2 pages.
Second Office Action for Chinese Patent Application No. 201080031821.1, issued Nov. 15, 2013, 14 pages.
First Office Action for Chinese Patent Application No. 201080032268.3, issued Dec. 24, 2013, 8 pages.
Second Office Action for Chinese Patent Application No. 201080032268.3, issued Oct. 24, 2014, 17 pages.
Office Action for Chinese Patent Application No. 201080045277.6, issued Sep. 26, 2013, 5 pages.
Notification of Reason for Refusal for Japanese Patent Application No. 2012-520769, mailed Mar. 5, 2014, 10 pages.
Office Action for Japanese Patent Application No. 2012-520821, mailed May 14, 2014, 6 pages.
Final Rejection for Japanese Patent Application No. 2012-520821, mailed Feb. 9, 2015, 4 pages.
Notification of Reason for Refusal for Japanese Patent Application No. 2012-533215, issued Sep. 26, 2013, 5 pages.
Notification of Reason for Refusal for Japanese Patent Application No. 2012-533215, issued Jun. 27, 2014, 12 pages.
Office Action for Korean Patent Application No. 10-2012-7003687, issued May 31, 2013, 7 pages.
Office Action for Korean Patent Application No. 10-2012-7003687, issued Feb. 27, 2014, 7 pages.
Decision of Refusal for Korean Patent Application No. 10-2012-7003687, issued Dec. 26, 2014, 5 pages.
Office Action for Korean Patent Application No. 10-2012-7011568, issued Oct. 21, 2013, 8 pages.
International Search Report and Written Opinion for PCT/US2010/042079, mailed Mar. 23, 2011, 14 pages.
International Preliminary Report on Patentability for PCT/US2010/042079, mailed Jan. 24, 2012, 19 pages.
International Search Report for PCT/US2010/042333, mailed Jan. 25, 2012, 8 pages.
International Preliminary Report on Patentability for PCT/US2010/042333, mailed Feb. 9, 2012.
International Search Report and Written Opinion for PCT/US2010/050711, mailed Jul. 1, 2011, 15 pages.
Written Opinion for PCT/US2010/050711, mailed Nov. 18, 2011, 6 pages.
International Preliminary Report on Patentability for PCT/US2010/050711, mailed Jan. 27, 2012, 17 pages.
Non-Final Office Action for U.S. Appl. No. 12/484,542, mailed Apr. 5, 2012, 6 pages.
Non-Final Office Action for U.S. Appl. No. 12/484,542, mailed Nov. 19, 2012, 15 pages.

(56) References Cited

OTHER PUBLICATIONS

Restriction Requirement for U.S. Appl. No. 12/573,982, mailed Jun. 6, 2012, 6 pages.
Non-Final Office Action for U.S. Appl. No. 12/573,982, mailed Sep. 4, 2012, 13 pages.
Final Office Action for U.S. Appl. No. 12/573,982, mailed Mar. 1, 2013, 16 pages.
Advisory Action for U.S. Appl. No. 12/573,982, mailed May 15, 2013, 3 pages.
Non-Final Office Action for U.S. Appl. No. 12/573,982, mailed Jul. 18, 2013, 15 pages.
Final Office Action for U.S. Appl. No. 12/573,982, mailed Dec. 5, 2013, 15 pages.
Examiner's Answer for U.S. Appl. No. 12/573,982, mailed Aug. 20, 2014, 19 pages.
Non-Final Office Action for U.S. Appl. No. 12/573,982, mailed Jan. 9, 2015, 13 pages.
Non-Final Office Action for U.S. Appl. No. 12/628,594, mailed Sep. 24, 2012, 9 pages.
Final Office Action for U.S. Appl. No. 12/628,594, mailed Mar. 1, 2013, 9 pages.
Non-Final Office Action for U.S. Appl. No. 12/573,982, mailed Dec. 18, 2015, 10 pages.
Non-Final Office Action for U.S. Appl. No. 12/836,688, mailed Dec. 14, 2015, 8 pages.
Notice of Reasons for Rejection for Japanese Patent Application No. 2015-037591, mailed Dec. 11, 2015, 17 pages.
Reasons for Decision of Rejection for Korean Divisional Patent Application No. 10-2015-7007662, mailed Dec. 24, 2015, 5 pages.

\* cited by examiner

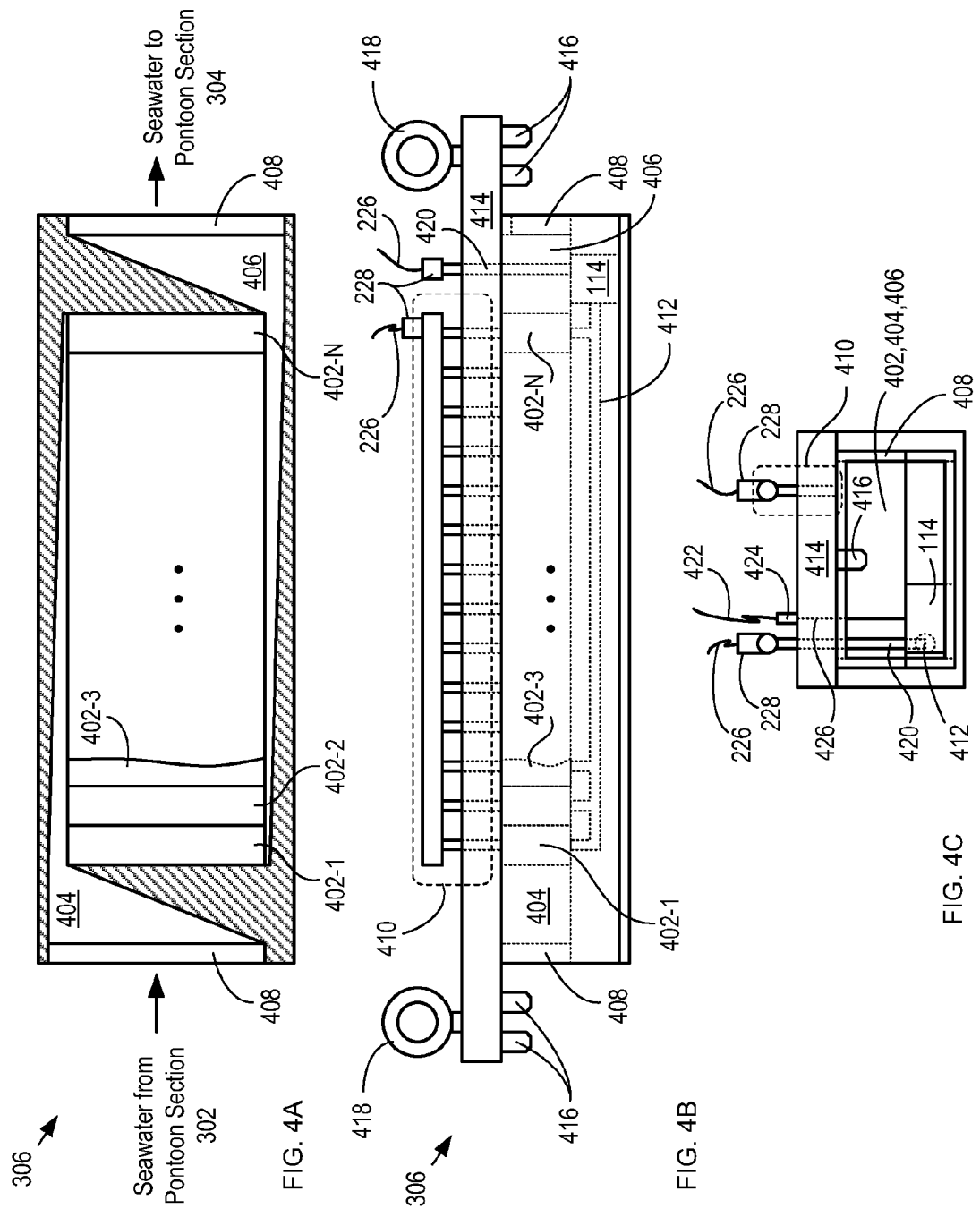

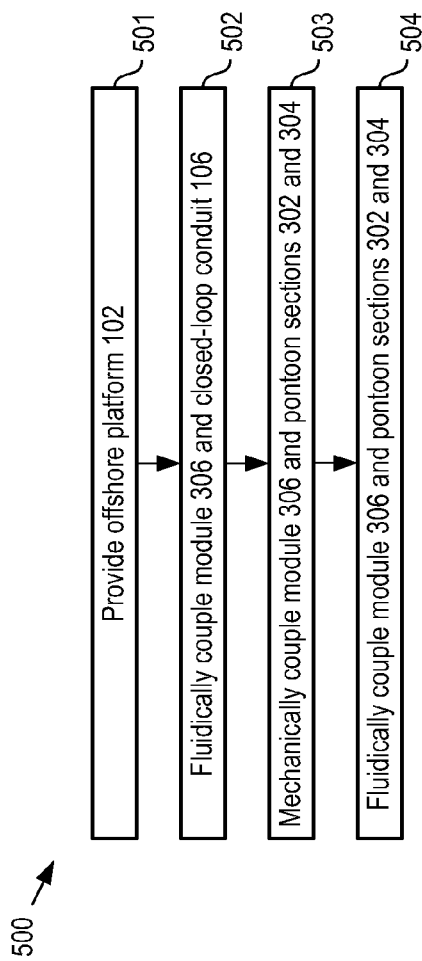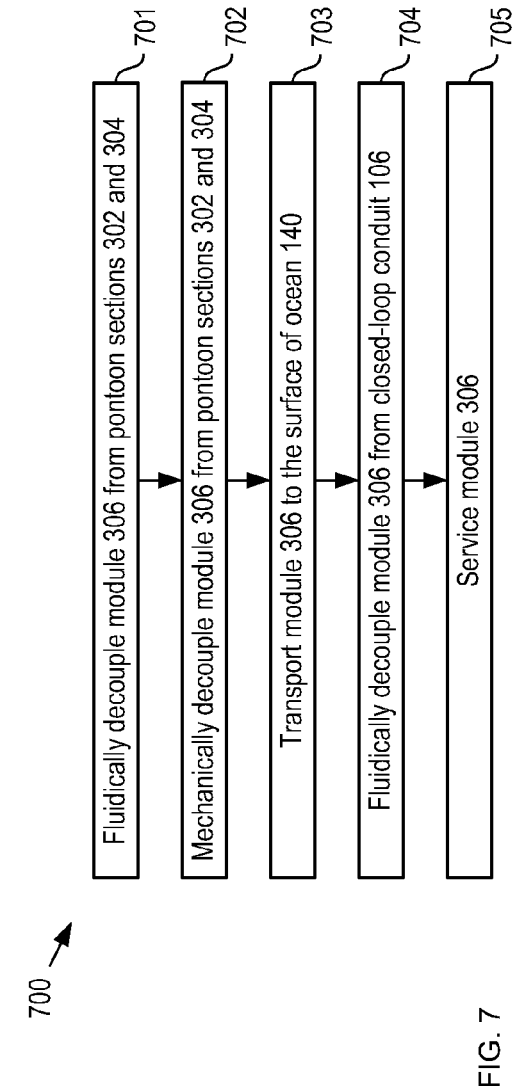

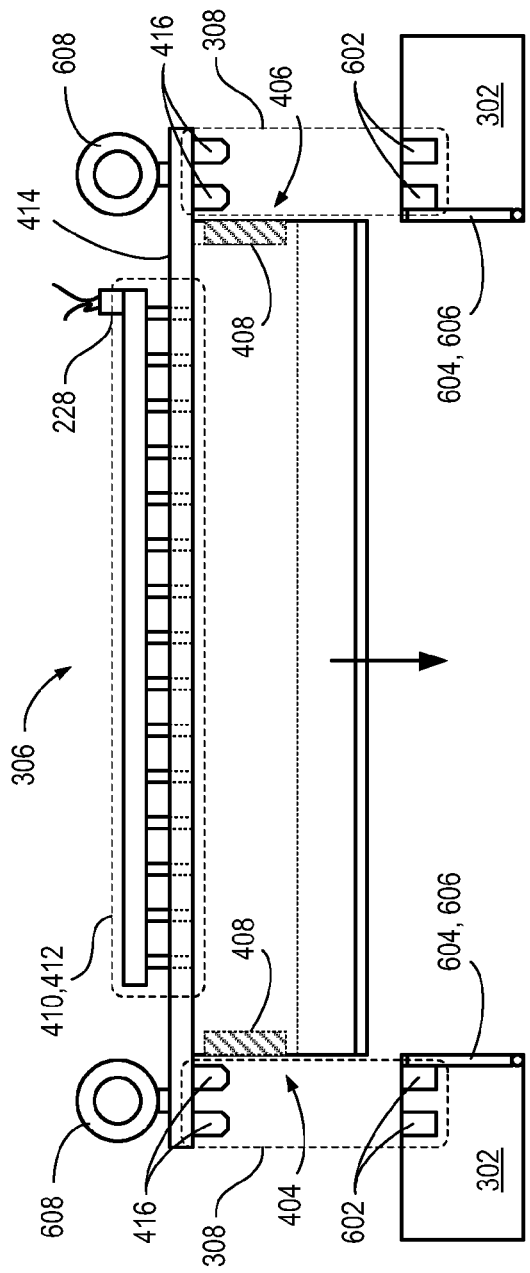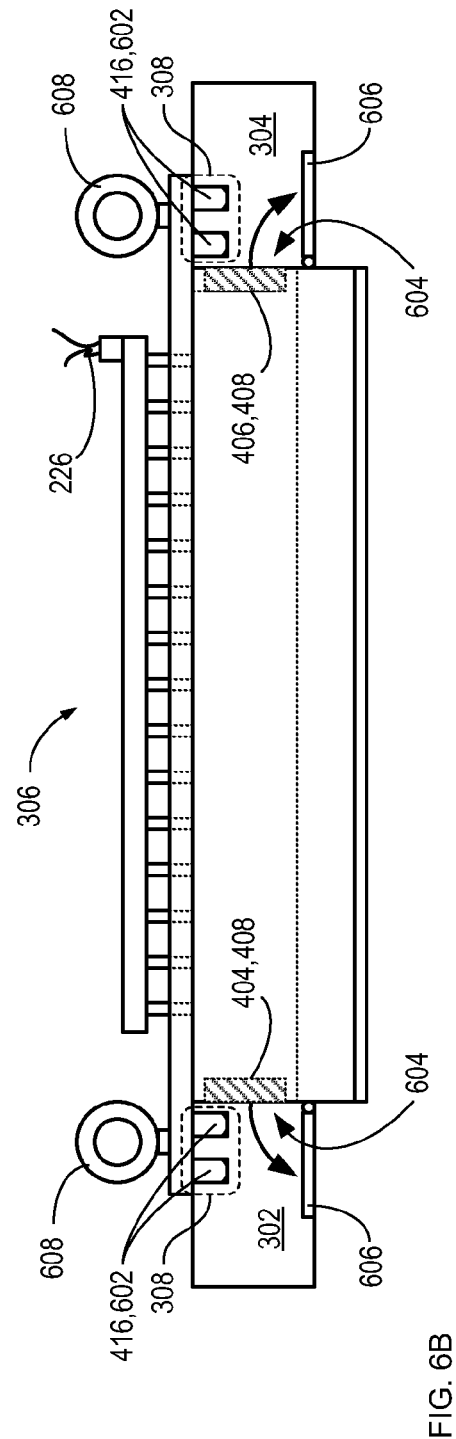
FIG. 6A
FIG. 6B

MODULAR HEAT-EXCHANGE APPARATUS

CROSS-REFERENCE TO RELATED APPLIACTIONS

This case is a continuation-in-part of co-pending U.S. patent application Ser. No. 13/032,119, filed Feb. 22, 2011, entitled "Manifolding Arrangement for a Modular Heat-Exchange Apparatus", which claims the benefit of U.S. Provisional Application Ser. No. 61/388,881, filed Oct. 1, 2010, entitled "Heat-Exchange Apparatus with Pontoon-based Fluid Distribution System".

If there are any contradictions or inconsistencies in language between this application and one or more of the cases that have been incorporated by reference that might affect the interpretation of the claims in this case, the claims in this case should be interpreted to be consistent with the language in this case.

FIELD OF THE INVENTION

The present invention relates to heat exchangers in general, and, more particularly, to heat exchangers for ocean thermal energy conversion (OTEC) systems.

BACKGROUND OF THE INVENTION

An Ocean Thermal Energy Conversion (OTEC) system generates electrical energy based on a temperature difference between cold seawater at a deep-water region and warm seawater near the ocean surface. Typically, OTEC systems rely upon large, robust heat exchangers that transfer heat between a working fluid and the seawater as part of a Rankine-cycle engine.

In the Rankine cycle, heat from the warm seawater is transferred into the working fluid at heat exchangers configured as evaporators, where the working fluid is vaporized. The warm seawater is pumped from the surface region to the evaporators via a seawater conduit. The vaporized working fluid drives a turbogenerator that generates the electrical energy. After it has passed through the turbogenerator, heat is transferred from the vaporized working fluid into the cold seawater at heat exchangers configured as condensers, where the vapor condenses back into liquid form. The cold seawater is pumped from the deep-water region to the condensers via a cold-water conduit, which is often 1000 meters long or more. In a closed-cycle system, the liquefied working fluid is pumped back to the evaporators to continue the Rankine cycle.

The heat exchangers are sometimes located on a ship or on the deck of an offshore platform, such platforms used in oil drilling, etc. It is preferable, however, that the heat exchangers are submerged below the water line to reduce platform costs and reserve deck space, among other things. In some cases, heat exchangers are housed in submerged compartments that are part of the offshore platform itself.

OTEC heat exchangers must withstand prolonged exposure to the working fluid (e.g., ammonia), as well as a large secondary flow of the seawater—particularly for submerged OTEC heat exchangers. Further, it is highly desirable, if not necessary, that such heat exchangers provide high overall heat transfer coefficients, exhibit minimal mechanical pumping losses, and are light weight. Still further, it is important that the materials and fabrication costs of these heat exchangers are not excessive.

Unfortunately, OTEC heat exchangers are highly susceptible to biofouling, corrosion, and degradation over the operating lifetime of an OTEC system. It is necessary, therefore, to have access to the heat exchangers for regular maintenance, as well as emergency repair and/or replacement. In addition, it is often desirable to upgrade the capability of an OTEC system by, for example, adding heat exchangers, upgrading heat exchangers to increase heat-transfer capacity, etc.

Removal and/or attachment of a submerged heat exchanger can be extremely challenging, however—especially in cases when such operations require personnel to gain access to underwater compartments and/or require special diver operations. In addition, it is often necessary to shut down the OTEC system during maintenance, repair, and upgrade operations. These shutdown periods can have significant impact on the overall production capability of such systems.

SUMMARY OF THE INVENTION

The present invention provides an OTEC system that overcomes some of the limitations and drawbacks of the prior art. Embodiments of the present invention enable simplified integration (or removal) of multiple heat exchangers with (from) an OTEC energy generation system located on an offshore platform or vessel deployed in an ocean or other body of water. Further, embodiments of the present invention enable reconfiguration of the heat exchange capacity of an OTEC system while the OTEC system continues to operate.

An embodiment of the present invention comprises heat exchanger modules (modules), each of which comprises a plurality of heat exchangers. Each module is an individual, discrete unit that can be added or removed to the OTEC system, while submerged, without shutting down other modules integrated into the OTEC system.

Each module comprises a plurality of heat exchangers, which are fluidically coupled with a common seawater inlet and common seawater outlet. The individual heat exchangers are also fluidically coupled with a working fluid inlet manifold and working fluid outlet manifold. The module is dimensioned and arranged to physically and fluidically couple the inlet and outlet with ports located at a seawater source and seawater sink. Each of the seawater source and seawater sink comprises a plurality of ports, and the flow of seawater through each port is controlled by a valve at that port. In some embodiments, each of the seawater source and seawater sink is a pontoon located on an offshore platform.

In some embodiments, the working fluid manifolds of each module are fluidically coupled to each of a working-fluid feed and working-fluid return via flexible conduits. As a result, the modules can be fluidically coupled to the working-fluid feed and working-fluid return at the surface of the ocean (or on the deck of the offshore platform) and then lowered to the depth at which they are to be attached to the offshore platform.

The present invention enables maintenance, repair, and upgrade operations at a deployed OTEC system with less complexity that OTEC system in the prior art. In addition, the present invention reduces the OTEC system downtime associated with such operations. A method in accordance with the present invention comprises: (1) fluidically connecting a module and a working-fluid feed and working-fluid return at the deck of an offshore platform; (2) lowering the module to a depth of the pontoons of the offshore platform; (3) physically coupling the module and pontoons of the offshore platform, where the pontoons comprise a seawater source and a seawater sink; (4) fluidically coupling the seawater inlet of the module and the seawater source; and (5) fluidically coupling the seawater outlet of the module and the seawater sink. Further, the present invention enables scalable OTEC systems whose energy production capacity can be readily changed in response to a change in the demand on the system. Scalability can be achieved in accordance with the present invention by:
i. changing the number of modules integrated into an OTEC system; or
ii. changing the number of heat exchangers included in one or more modules; or
iii. changing the heat-transfer capacity of a module by replacing one or more heat exchangers within the module with heat exchangers having a different heat-transfer capacity; or
iv. any combination of i, ii, and iii.

An embodiment of the present invention comprises: a first module, wherein the first module comprises; a first plurality of heat exchangers for transferring heat between a first fluid and a second fluid, and a first frame, wherein the first frame is dimensioned and arranged to demountably attach to an offshore platform at a first depth in a body of water; wherein each of the first plurality of heat exchangers is demountably attached to the first frame.

BRIEF DESCRIPTION OF THE DRAWINGS

FIGS. 4A-C depict schematic drawings of a top view, cross-sectional view, and side view, respectively, of a module in accordance with the illustrative embodiment of the present invention.

FIG. 5 depicts operations of a method for installing a module on an offshore platform in accordance with the illustrative embodiment of the present invention.

FIGS. 6A and 6B depict schematic drawings of a module prior to and after engagement with pontoons of an offshore platform in accordance with the illustrative embodiment of the present invention.

FIG. 7 depicts operations of a method for servicing a module in accordance with the illustrative embodiment of the present invention.

DETAILED DESCRIPTION

Figure 1:
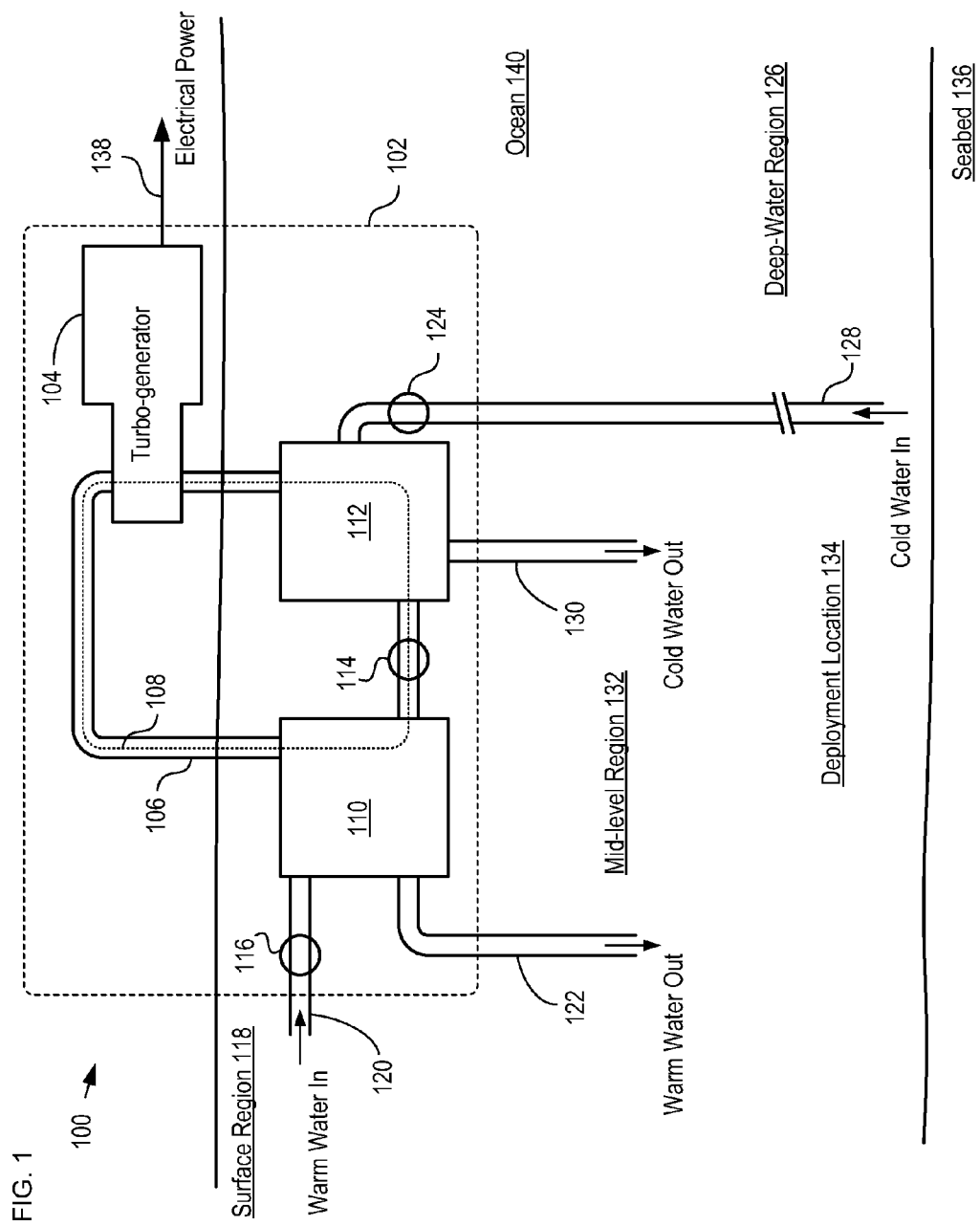
FIG. 1 depicts a schematic diagram of an OTEC power generation system in accordance with an illustrative embodiment of the present invention.

FIG. 1 depicts a schematic diagram of an OTEC power generation system in accordance with an illustrative embodiment of the present invention. OTEC system 100 comprises offshore platform 102, turbogenerator 104, closed-loop conduit 106, evaporator 110, condenser 112, pumps 114, 116, and 124, and conduits 120, 122, 128, and 130.

Offshore platform 102 is a tension leg offshore platform comprising a buoyant hull, which includes a deck, caissons, and pontoons (not shown for clarity). The hull is supported above seabed 136 by rigid tension legs that are anchored to seabed 136 at deployment location 134. In some instances, offshore platform 102 is a "grazing plant" that is not anchored to the ocean floor but is allowed to drift.

In some embodiments, offshore platform 102 is deployed at a deployment location in a body of water other than an ocean (e.g., a lake, sea, etc.). In some embodiments, offshore platform 102 is an offshore platform other than a tension leg offshore platform, such as a semi-submersible, spar, drill ship, jack-up offshore platform, grazing plant, and the like.

Turbogenerator 104 is a conventional turbine-driven generator mounted on floating offshore platform 102. Turbogenerator 104 generates electrical energy in response to a flow of fluid and provides the generated electrical energy on output cable 138.

Closed-loop conduit 106 is a conduit for conveying working fluid 108 through evaporator 110, condenser 112, and turbogenerator 104.

Evaporator 110 comprises a plurality of heat exchanger modules (hereinafter referred to as "modules"), each of which comprises a plurality of heat exchangers that are configured to induce evaporation of working fluid 108. Evaporator 110 is mechanically and fluidically coupled with offshore platform 102, as described below and with respect to FIG. 2.

Condenser 112 comprises a plurality of modules, each of which comprises a plurality of heat exchangers that are configured to induce condensation of vaporized working fluid 108 into liquid form. Condenser 112 is mechanically and fluidically coupled with offshore platform 102, as described below and with respect to FIG. 2.

One skilled in the art will recognize that the operation of a heat exchanger as evaporator or condenser is dependent upon the manner in which it is fluidically configured within OTEC system 100.

Turbogenerator 104, closed-loop conduit 106, evaporator 110, and condenser 112 collectively form a Rankine-cycle engine that generates electrical energy based on the difference in the temperature of water in surface region 118 and the temperature of water in deep-water region 126.

In typical operation, pump 114 pumps working fluid 108, in liquid form, through closed-loop conduit 106 to evaporator 110. Ammonia is often used as working fluid 108 in OTEC systems; however, it will be clear to one skilled in the art that any fluid that evaporates at the temperature of the water in surface region 118 and condenses at the temperature of the water in deep water region 126 is suitable for use as working fluid 108 (subject to material compatibility constraints).

Pump 116 draws warm seawater from surface region 118 into evaporator 110 via conduit 120. In a typical OTEC deployment, the water in surface region 118 is at a substantially constant temperature of approximately 25 degrees centigrade (subject to weather and sunlight conditions). At evaporator 110, heat from the warm water is absorbed by working fluid 108, which induces the working fluid to vaporize. After passing through evaporator 110, the now slightly cooler water is ejected back into ocean 140 via conduit 122. The output of conduit 122 is typically located deeper in ocean 140 than surface region 118 (i.e., mid-level region 132) to avoid decreasing the average water temperature in the surface-water region.

The expanding working fluid 108 vapor is forced through turbogenerator 104, thereby driving the turbogenerator to generate electrical energy. The generated electrical energy is provided on output cable 138. After passing through turbogenerator 104, the vaporized working fluid enters condenser 112.

Pump 124 draws cold seawater from deep water region 126 into condenser 112 via conduit 128. Typically deep water region 126 is approximately 1000 meters below the surface of the body of water, at which depth water is at a substantially constant temperature of a few degrees centigrade. The cold water travels through condenser 112 where it absorbs heat from the vaporized working fluid. As a result, working fluid 108 condenses back into liquid form. After passing through condenser 112, the now slightly warmer water is ejected into ocean 140 via conduit 130. The output of conduit 130 is typically located at a shallower depth in ocean 140 than that of deep-water region 126 (i.e., mid-level region 132) to avoid increasing the average water temperature in the deep-water region.

Pump 114 pumps the condensed working fluid 108 back into evaporator 110 where it is again vaporized; thereby continuing the Rankine cycle that drives turbogenerator 104.

Figure 2:
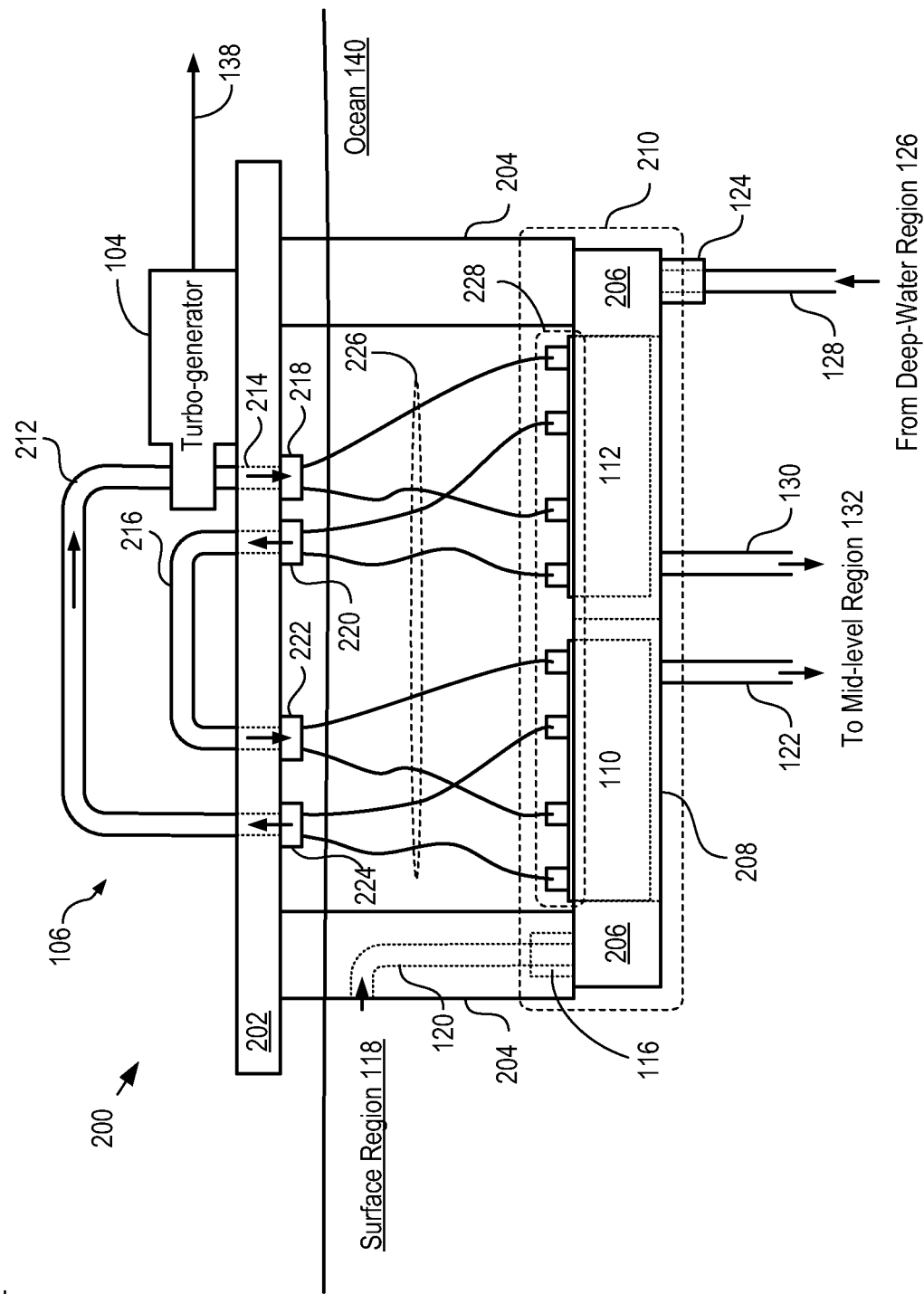
FIG. 2 depicts a schematic diagram of a side-view of an offshore tension-leg offshore platform hull in accordance with the illustrative embodiment of the present invention.

FIG. 2 depicts a schematic diagram of a side-view of an offshore tension-leg offshore platform hull in accordance with the illustrative embodiment of the present invention. For clarity, the tension legs and pilings are not shown in FIG. 2. Hull 200 comprises deck 202, caissons 204, and pontoons 206. Evaporator 110 and condenser 112 are integrated into hull 200 between pontoons 206.

Deck 202 is a surface for supporting, among other things, turbogenerator 104, energy storage systems, operational personnel, and living quarters.

Each of caissons 204 is a vertical support that has a buoyancy and water plane area suitable for supporting deck 202 above the ocean surface.

Pontoons 206 and 208 are horizontally oriented floats that augment the buoyancy of caissons 204. In some embodiments, the buoyancy of one or more of pontoons 206 and 208 is controllable.

Pontoons 206 are conventional pontoons used to provide buoyancy and/or ballasting in prior-art offshore platforms.

It is an aspect of the present invention that each of the modules included in evaporator 110 and condenser 112 is submerged in ocean 140 and individually mechanically and fluidically coupled with pontoons 208 at pontoon level 210. As a result, any of these modules can be mechanically and fluidically decoupled from their seawater source and seawater sink without significantly affecting the operation of the remaining modules.

Each of pontoons 208 comprises channels for conveying seawater to and/or ports at which evaporator 110 and condenser 112 are located. Further, in some embodiments, at least one pontoon conveys seawater provided to it by a distribution system contained within a caisson 204. Such an arrangement is depicted in FIG. 2, for example, wherein warm seawater is pumped by pump 116 to one of pontoons 208 via conduit 120. In some embodiments, at least one pump for drawing seawater into a pontoon is located within the pontoon itself. In some embodiments, pumps are located external to both the caissons and pontoons. The integration of evaporator 110, condenser 112, and pontoons 208 is described in more detail below and with respect to FIGS. 3 and 4.

Closed-loop conduit 106 comprises several conduit portions: conduits 212, 214, and 216, manifolds 218, 220, 222, and 224, flexible conduits 226, and flow channels through heat exchangers included in each of evaporator 110 and condenser 112. Each of flexible conduits 226 is connected by a demountable coupling 228 between manifolds 218, 220, 222, and 224 and the modules included in each of evaporator 110 and condenser 112. For the purposes of this Specification, including the appended claims "demountable" is defined as capable of repeated connection and disconnection. Examples of a demountable coupling include threaded hose fittings, spring-loaded hydraulic or pneumatic connectors, upchurch connectors, and the like. A demountable coupling, for example, is not connected via welding, brazing, or another substantially permanent joining technique.

Working fluid circulates through OTEC system 100 such that liquid working fluid is drawn from conduit 216 through manifold 222 into each of two modules included in evaporator 110, where the working fluid vaporized. The vaporized working fluid 108 is conveyed through manifold 224 into conduit 212, which conveys it to turbogenerator 108. The expanding working fluid drives turbogenerator 104 to generate electrical energy. After passing through the turbogenerator, the vaporized working fluid flows through conduit 214 to manifold 218. Manifold 218 feeds the vaporized working fluid 108 to each of two modules included in condenser 112. At condenser 112, the vaporized working fluid is condensed back into liquid form. The now-liquefied working fluid is pumped by each of the modules through manifold 220 back into conduit 216 to complete the flow cycle.

As described in more detail below and with respect to FIG. 4, each module included in condenser 112 and evaporator 110 includes a pump 114 that pumps working fluid through the heat exchangers included in the module. In some embodiments, working fluid 108 is pumped through OTEC system 100 by one or more pumps located on deck 202, mounted on a caisson 204, or located in another suitable location on platform 200. It should be noted that in the illustrative embodiment, each module includes an integrated pump. Electrical cables that extend from deck 202 to the modules are required for providing electrical energy to these pumps; however, for clarity, these electrical cables are not shown in FIG. 2.

It is an aspect of the present invention that the modules included in each of evaporator 110 and condenser 112 can be individually disconnected from pontoons 208 (mechanically and fluidically) and brought to the surface of ocean 140. Once at the surface, a module can easily be replaced, repaired, refurbished, or exchanged for a heat exchanger having a different heat transfer capacity. Since making and breaking connections in closed-circuit conduit 106 under water is problematic, flexible conduits 226 are provided between manifolds 218 through 224 and the individual modules. This facilitates the transport of the modules between the surface of ocean 140 and pontoon level 210 without making or breaking these connections.

Figure 3:
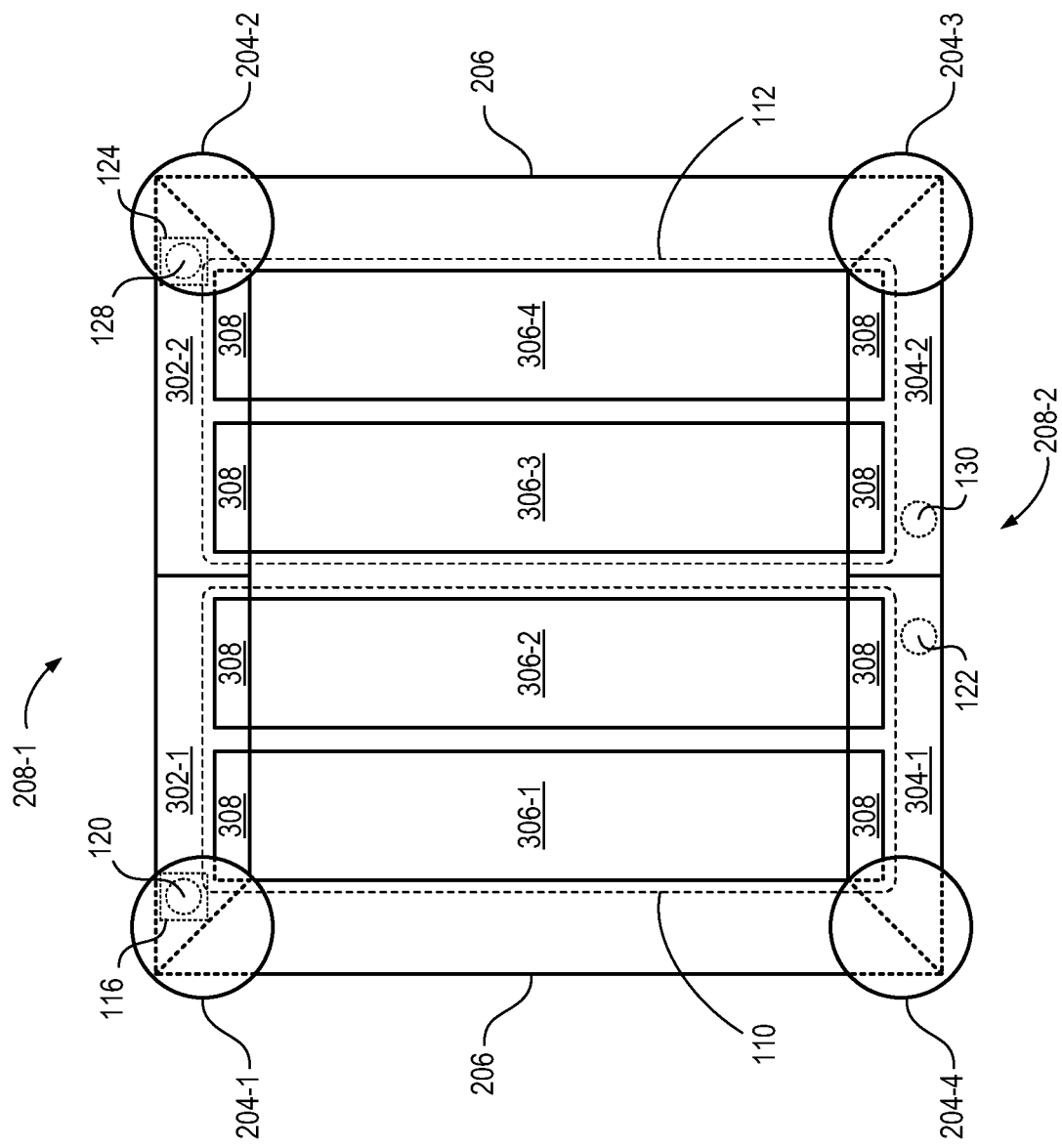
FIG. 3 depicts a schematic drawing of a top view of pontoon level 210.

FIG. 3 depicts a schematic drawing of a top view of pontoon level 210. For clarity, the pumps, conduits, and couplings for conveying working fluid through the modules of evaporator 110 and condenser 112 are not shown in FIG. 3.

Each of pontoons 208-1 and 208-2 is divided into two sections, which are fluidically and thermally isolated from one another. Pontoon sections 302-1 and 304-1 are mechanically and fluidically coupled with modules 306-1 and 306-2 (i.e., evaporator 110). Pontoon sections 302-2 and 304-2 are mechanically and fluidically coupled with modules 306-3 and 306-4 (i.e., condenser 112).

Although in illustrative embodiment each of evaporator 110 and condenser 112 comprises two modules, it will be clear to one skilled in the art, after reading this Specification, how to specify, make, and use alternative embodiments of the present invention comprising an evaporator and/or condenser that comprises any practical number of modules. In some embodiments, at least one of evaporator and condenser comprises fewer modules than can be accommodated by its corresponding pontoons 208. Such embodiments facilitate expansion of heat exchanger capacity as demand increases through the life of an OTEC offshore platform.

Modules 306-1 through 306-4 (collectively referred to as modules 306) are located with respect to pontoons 208-1 and 208-2 by seats 308. Seats 308 position the modules so that they are fluidically coupled to pontoon sections 302-1, 302-2, 304-1, and 304-2 in a substantially leak-proof manner. Seats 308 and the fluidic coupling between the modules and the pontoon sections are described in detail below and with respect to FIGS. 4A & B.

Pump 116 and conduit 120 are contained within caisson 204-1 and fluidically coupled with pontoon section 302-1. Pump 116 draws warm seawater from surface region 118 into pontoon section 302-1. Pontoon section 302-1 conveys the warm seawater to each of modules 306-1 and 306-2.

After passing through modules 306-1 and 306-2, the seawater is channeled to conduit 122 by pontoon section 304-1.

In similar fashion, pump 124 draws cold seawater from deep-water region 126 through conduit 128 and into pontoon section 302-2. Pontoon section 302-2 conveys the cold seawater to each of modules 306-3 and 306-4.

After passing through modules 306-3 and 306-4, the seawater is channeled to conduit 130 by pontoon section 304-2.

Each of pontoon sections 302-1, 302-2, 304-1, and 304-2 is dimensioned to mitigate drops in seawater pressure as it channels seawater.

FIGS. 4A-C depict schematic drawings of a top view, cross-sectional view, and side view, respectively, of a module in accordance with the illustrative embodiment of the present invention. Module 306 comprises heat exchangers 402-1 through 402-N, inlet 404, outlet 406, gaskets 408, manifold 410 and 412, support plate 414, guide pins 416, pump 114, and conduit 420. Module 306 is representative of each of modules 306-1 through 306-4.

Heat exchangers 402-1 through 402-N (collectively referred to as heat exchangers 402) are conventional plate-frame heat exchangers suitable for use in an OTEC application. In some embodiments, at least one of heat exchangers 402 is other than a plate-frame heat exchanger, such as a tube-shell heat exchanger, brazed aluminum heat exchanger, and the like.

Inlet 404 is a conduit for fluidically coupling module 306 to a pontoon section 302. Inlet 404 feeds received seawater from a seawater source at a pontoon section 302 to each of heat exchangers 402. Inlet 404 is tapered such that it progressively narrows along its length from heat exchanger 402-1 to 402-N.

Outlet 406 is a conduit for fluidically coupling module 306 to a pontoon section 304. Outlet 406 collects seawater from each of heat exchangers 402 and channels the seawater to a seawater sink located at a pontoon section 304. Outlet 406 is tapered such that it progressively widens along its length from heat exchanger 402-1 to 402-N.

Inlet 404 and outlet 406 are designed to mitigate drops in water pressure and maintain a substantially constant flow velocity as the seawater enters and exits the module. In other words, the tapered shape of inlet 404 and outlet 406 helps keep the seawater flow velocity and pressure drop substantially constant across heat exchangers 402. In some embodiments, the shape of at least one of inlet 404 and outlet 406 is substantially constant along its length from heat exchanger 402-1 to 402-N.

Gaskets 408 seal the fluidic connections between module 306 and each of pontoon sections 302 and 304.

Pump 114 draws working fluid into module 306 from manifold 410, which distributes the working fluid to each of heat exchangers 402. Manifold 410 receives the working fluid from flexible conduit 226 at coupling 228.

Pump 114 is electrically coupled with an electrical system located on deck 202 by means of electrical cable 422. This electrical system provides power, control signals, etc., to pump 114. Electrical cable 422 is a flexible electrical cable that extends from deck 202 to waterproof connector 424 located on module 306. Connector 424 is an electrical bulkhead connector suitable for immersion in seawater. Connector 424 enables electrical connection between electrical cable 422 and pump 114 through cable 426. For clarity, electrical cable 422, connector 424, and cable 426 are only depicted in FIG. 4C. In some embodiments, electrical cable 422 conveys electrical signals between the electrical system and devices other than pumps (e.g., sensors, fluidic control elements, controllable dampers, etc.) included in module 306.

After passing through heat exchangers 402, the working fluid passes into manifold 412, which conveys it to pump 114. From pump 114, the working fluid passes through conduit 420 to flexible conduit 426 via coupling 428.

Support plate 414 is a rigid plate that forms a portion of the housing of module 306. Support plate 414 also provides a mounting surface for guide pins 416, as well as surfaces for supporting module 306 from pontoon sections 302 and 304.

Guide pins 416 are rigid pins for mating with receivers located on pontoon sections 302 and 304. Guide pins 408 are mounted to the underside of support plate 402. Guide pins 408 are sized to mate with the receivers to locate module 306 between pontoon sections 302 and 304. In some embodiments, guide pins are tapered or beveled to facilitate their mating with the receivers.

Rings 418 are attached to support plate 414 to facilitate moving module 306 between the surface of ocean 140 and pontoon level 210. Rings 418 provide attachment points for crane cables, hoists, rigs, or other such handling apparatus suitable for raising and lowering module 306. One skilled in the art will recognize that rings 418 represent only one of many features that can be included for this purpose.

FIG. 5 depicts operations of a method for installing a module on an offshore platform in accordance with the illustrative embodiment of the present invention. Method 500 begins with operation 501, wherein offshore platform 102 is deployed at deployment location 134 of ocean 140. Method 500 is a representative process for engaging any of modules 306-1 through 306-4 with any of pontoon sections 302-1, 302-2, 304-1, and 304-2. Method 500 is described with continuing reference to FIGS. 1-3, 4A, and 4B and additional reference to FIGS. 6A and 6B.

FIGS. 6A and 6B depict schematic drawings of a module prior to and after engagement with pontoons of an offshore platform in accordance with the illustrative embodiment of the present invention. For clarity, module 306 is depicted without internal fluid channels, and heat exchangers. For the purposes of this Specification, including the appended claims, a module is defined as "operatively engaged" with an offshore platform when the module is physically coupled and fluidically coupled with pontoon sections of the offshore platform.

Each of pontoon sections 302 and 304 comprises receivers 602, ports 604, and flapper valves 606.

At operation 502, flexible conduits 226 are attached to couplings 228 of module 306 while the module is at the surface of ocean 140. This fluidically couples the module with closed-loop conduit 106. After the flexible conduits are attached, module 306 is submerged and conveyed to pontoon level 210.

At operation 503, module 306 is mechanically coupled with pontoon sections 302 and 304 by locating guide pins 416 of module 306 in receivers 602 of the pontoon sections. Guide pins 416 and receivers 602 collectively define seats 308. Operation 503 also places inlet 404 and outlet 406 in proper alignment with ports 604 and 606. As a result, inlet 404, outlet 406, and ports 604 and 606 can be fluidically coupled.

In some embodiments, seat 308 further comprises a latch or similar mechanism for demountably securing guide pins 416 in receivers 602. In some embodiments, such latches are actuatable from deck 202 by means of a remote actuator system, such as a hydraulic system, mechanical cable, electrical actuator, and the like.

Once guide pins 416 are located in receivers 602, support plate 414 rests on the top surfaces of pontoon sections 302 and 304. In addition, gaskets 408 of the module are aligned and sealed against ports 604 of the pontoon sections.

At operation 504, valves 606 are opened to fluidically couple module 306 and pontoon sections 302 and 304.

Valves 606 are remotely actuatable flapper valves for controlling the flow of seawater through ports 604. Although the illustrative embodiment comprises valves that are flapper valves, it will be clear to one skilled in the art, after reading this Specification, how to specify, make, and use alternative embodiments of the present invention wherein at least one of valves 606 comprises a valve other than a flapper valve. Valves suitable for use in embodiments of the present invention include, without limitation, flapper valves, iris valves, ball valves, sluice gates, and the like.

Valves 606 enable each module to be fluidically coupled or decoupled independently from other modules that are operatively engaged with the offshore platform. As a result, the present invention enables:
  i. deployment of an offshore platform whose heat transfer capacity is scalable with demand; or
  ii. reduced downtime for maintenance of an offshore platform; or
  iii. rapid replacement of an impaired module; or
  iv. rapid replacement of a module having a first heat transfer capacity with another module having a second heat transfer capacity; or
  v. any combination of i, ii, iii, and iv.

It should be noted that method 500 enables the installation of a first heat exchanger module into an OTEC system located on an offshore platform. Method 500 also enables the installation of additional heat exchanger modules to such an OTEC system while the OTEC system is operational and without significantly diminishing the energy production capacity of the OTEC system during installation of the additional modules.

FIG. 7 depicts operations of a method for servicing a module in accordance with the illustrative embodiment of the present invention. Method 700 begins with operation 701, wherein valves 606 are closed to seal ports 604. As a result, module 360 is fluidically decoupled from pontoon sections 302 and 304.

At operation 702, module 360 is lifted out of its location between pontoon sections 302 and 304 to mechanically decouple the module from offshore platform 102.

At operation 703, module 306 is brought to the surface of ocean 140 and lifted onto deck 202. In some embodiments, module 306 is lowered or raised by handling cranes, such as those used to load containers onto a container ship. In some embodiments, one or more rigs that attach to rings 418 are used to lift module 306 to the surface and/or onto deck 202. It will be clear to one skilled in the art, after reading this Specification, how to convey module 306 between the surface of a body of water and pontoon level 210.

At operation 704, flexible conduits 226 are disconnected from couplings 228 of module 306. This fluidically decouples module 306 and closed-loop conduit 106.

At operation 705, module 306 is serviced. Servicing module 306 includes:
  i. exchanging at least one of heat exchangers 402 with a replacement heat exchanger having the same heat transfer capacity; or
  ii. exchanging at least one of heat exchangers 402 with a replacement heat exchanger having a different heat transfer capacity; or
  iii. refurbishing at least one of heat exchangers 402; or
  iv. cleaning at least one of heat exchangers 402; or
  v. changing the number of heat exchangers included in module 306; or
  vi. any combination of i, ii, iii, iv, and v.

Upon completion of servicing of module 306, it can be re-engaged with offshore platform 102 using operations 502 through 504 of method 500.

It should be noted that the operations of methods 500 and 700 can be performed concurrently to reduce the duration during which the operational capacity of OTEC system 100 is diminished. In other words, once a module has been disengaged from offshore platform 102 using operations of method 700, a replacement module can be installed into its former location using operations of method 500. As a result, the replacement module can be put into operation while the replaced module is being serviced.

Together, methods 500 and 700 afford embodiments of the present invention significant advantages over OTEC systems of the prior art. Specifically, the present invention enables the addition or removal of one or more heat exchanger modules to an offshore platform without shutting down other heat exchanger modules integrated into the offshore platform. This enables the scalability of an OTEC system to be easily changed by:
  i. changing the number of modules engaged in the OTEC system; or
  ii. changing the number of heat exchangers in a module; or
  iii. changing the thermal duty of one or more heat exchangers within a module; or
  iv. any combination of i, ii, and iii.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An apparatus comprising:
  a first module comprising:
    a first frame,
    a first plurality of heat exchangers configured to transfer heat between a first fluid and a second fluid, each heat exchanger of the first plurality of heat exchangers being fixed with respect to one another and demountably attached to the first; frame, and
    an attachment mechanism on the first frame comprising a first connector configured to demountably attach to a first submerged pontoon and a second connector configured to demountably attach to a second submerged pontoon in a body of water to fix the first module with respect to the first submerged pontoon and the second submerged pontoon.

2. The apparatus of claim 1 wherein the first module further comprises:
  a first inlet for receiving the first fluid from a source, wherein the first inlet and each of the first plurality of heat exchangers are fluidically coupled; and
  a first outlet for providing the first fluid to a sink, wherein the first outlet and each of the first plurality of heat exchangers is fluidically coupled;
  wherein the first pontoon comprises the source and the second pontoon comprises the sink.

3. The apparatus of claim 2 wherein the first inlet comprises a region having a tapered shape.

4. The apparatus of claim 1 wherein a first heat exchanger of the first plurality of heat exchangers is characterized by a first heat-transfer capacity and a second heat exchanger of the first plurality of heat exchangers is characterized by a second heat-exchange capacity that is substantially the same as the first heat-transfer capacity.

5. The apparatus of claim 1 wherein a first heat exchanger of the first plurality of heat exchangers is characterized by a first heat-transfer capacity and a second heat exchanger of the first plurality of heat exchangers is characterized by a second heat-transfer capacity that is different than the first heat-transfer capacity.

6. The apparatus of claim 1 further comprising:
a first plurality of couplings for fluidically coupling the first plurality of heat exchangers and a second-fluid feed; and
a second plurality of couplings for fluidically coupling the first plurality of heat exchangers and a second-fluid return.

7. The apparatus of claim 6 wherein a first coupling of the first plurality of couplings is a detachable coupling.

8. The apparatus of claim 6 further comprising a flexible conduit for conveying the second fluid between the second-fluid feed and the first plurality of couplings.

9. The apparatus of claim 1, further comprising a second module comprising:
a second frame,
a second plurality of heat exchangers for transferring heat between the first fluid and the second fluid, each heat exchanger of the second plurality of heat exchangers being fixed with respect to one another and demountably attached to the second frame, and
a second attachment mechanism on the second frame configured to demountably attach the second module to the first submerged pontoon and the second submerged pontoon.

10. The apparatus of claim 1 wherein the first module further comprises a pump for pumping one of the first fluid and second fluid through each of the first plurality of heat exchangers.

11. The apparatus of claim 1, wherein the first connector comprises a first guide pin that is configured to be received by a first receiver of the first pontoon and the second connector comprises a second guide pin that is configured to be received by a second receiver of the second pontoon.

12. The apparatus of claim 1, wherein the first module comprises a fluid inlet configured to receive water via the first pontoon and a fluid outlet configured to pass water to the second pontoon.

13. The apparatus of claim 1, wherein the first module further comprises a plurality of attachment points configured to be attached to a cable to effect vertical movement of the first module with respect to a surface of the body of water.

14. The apparatus of claim 1, wherein the first module further comprises:
an ingress conduit port configured to be coupled to an ingress conduit for receiving a liquid working fluid from above the body of water, and
an egress conduit port configured to be coupled to an egress conduit for communicating a vaporized working fluid above the body of water;
wherein the working fluid is the second fluid.

15. An apparatus comprising:
a first module comprising:
a first frame;
a first plurality of heat exchangers configured to transfer heat between a first fluid and a second fluid, each heat exchanger of the first plurality of heat exchangers being fixed with respect to one another and demountably attached to the first frame;
a first inlet for receiving the first fluid from a first submerged pontoon, wherein the first inlet and each of the first plurality of heat exchangers are fluidically coupled;
a first outlet for providing the first fluid to a second submerged pontoon, wherein the first outlet and each of the first plurality of heat exchangers are fluidically coupled; and
an attachment mechanism on the first frame configured to demountably attach to a submerged structure in a body of water to fix the first module with respect to the submerged structure, the submerged structure comprises the first pontoon and the second pontoon.

* * * * *